(12) United States Patent
Bernardele

(10) Patent No.: US 10,858,067 B2
(45) Date of Patent: Dec. 8, 2020

(54) BICYCLE REAR DERAILLEUR

(71) Applicant: CAMPAGNOLO S.r.l., Vicenza (IT)

(72) Inventor: Davide Bernardele, Caldogno (IT)

(73) Assignee: Campagnolo S.r.l., Vicenza (IT)

( * ) Notice: Subject to any disclaimer, the term of this patent is extended or adjusted under 35 U.S.C. 154(b) by 318 days.

(21) Appl. No.: 15/937,208

(22) Filed: Mar. 27, 2018

(65) Prior Publication Data

US 2018/0281899 A1 Oct. 4, 2018

(30) Foreign Application Priority Data

Mar. 31, 2017 (IT) .................. 102017000035716

(51) Int. Cl.
| | | |
|---|---|---|
| *B62M 9/1242* | (2010.01) | |
| *B62M 9/126* | (2010.01) | |
| *B62M 9/124* | (2010.01) | |
| *B62M 9/121* | (2010.01) | |
| *B62M 9/122* | (2010.01) | |
| *B62M 25/08* | (2006.01) | |

(52) U.S. Cl.
CPC .......... *B62M 9/1242* (2013.01); *B62M 9/121* (2013.01); *B62M 9/122* (2013.01); *B62M 9/124* (2013.01); *B62M 9/126* (2013.01); *B62M 25/08* (2013.01)

(58) Field of Classification Search
CPC .... B62M 9/126; B62M 9/125; B62M 9/1242; B62M 9/1248; B62M 9/127
USPC .......................................................... 474/82
See application file for complete search history.

(56) References Cited

U.S. PATENT DOCUMENTS

| | | | | | |
|---|---|---|---|---|---|
| 4,500,302 | A | * | 2/1985 | Crepin ................. | B62M 9/1242 474/82 |
| 4,610,644 | A | * | 9/1986 | Nagano .................. | B62M 9/126 474/82 |

(Continued)

FOREIGN PATENT DOCUMENTS

| | | |
|---|---|---|
| EP | 0 653 346 A1 | 5/1995 |
| EP | 0 655 386 A1 | 5/1995 |

(Continued)

OTHER PUBLICATIONS

EPO Office Action for EP 18162829.8—dated Apr. 12, 2019.

(Continued)

*Primary Examiner* — Henry Y Liu
(74) *Attorney, Agent, or Firm* — Volpe Koenig

(57) ABSTRACT

A rear derailleur with an articulated quadrilateral linkage movable body along respective parallel articulation axes perpendicular to a reference plane (REF), a base body on a bicycle frame along a drop-out axis (F), a chain guide being rotatable around a first rotation axis (R), an upper pulley rotatable around a second rotation axis (RS). The first rotation axis (R) and the second rotation axis (RS) are parallel and spaced by a distance of eccentricity (E). An angle of inclination (Q) of the articulated quadrilateral is defined by the angle that the drop-out axis (F) and the reference plane (REF) form on a plane passing through the drop-out axis (F) and perpendicular to the reference plane (REF). The angle of inclination (Q) being between 5° and 40°, including extreme values, and the distance of eccentricity (E) being between 18 mm and 50 mm, including extreme values.

20 Claims, 3 Drawing Sheets

(56) References Cited

U.S. PATENT DOCUMENTS

| | | | | |
|---|---|---|---|---|
| 4,690,663 A * | 9/1987 | Nagano | B62M 9/125 | 474/80 |
| 4,692,131 A * | 9/1987 | Nagano | B62M 9/1248 | 474/80 |
| 4,731,045 A * | 3/1988 | Nagano | B62M 9/125 | 474/78 |
| 4,755,162 A * | 7/1988 | Nagano | B62M 9/125 | 474/82 |
| 4,840,605 A * | 6/1989 | Testa | B62M 9/124 | 474/80 |
| 4,878,884 A * | 11/1989 | Romano | B62M 9/1242 | 474/82 |
| 4,895,553 A * | 1/1990 | Nagano | B62M 9/126 | 474/80 |
| 5,238,458 A * | 8/1993 | Ishibashi | B62M 9/1246 | 474/82 |
| 5,380,252 A * | 1/1995 | Iwasaki | B62M 9/1242 | 474/77 |
| 5,380,253 A * | 1/1995 | Iwasaki | B62M 9/1242 | 474/80 |
| 5,421,786 A * | 6/1995 | Ando | B62K 19/30 | 474/78 |
| 5,533,937 A * | 7/1996 | Patterson | B62M 9/125 | 474/80 |
| 5,597,366 A * | 1/1997 | Ozaki | B62M 9/1244 | 474/82 |
| 5,620,383 A * | 4/1997 | Patterson | B62M 9/12 | 474/80 |
| 5,624,335 A * | 4/1997 | Ando | B62M 9/1242 | 474/80 |
| 5,931,753 A * | 8/1999 | Ichida | B62M 9/1244 | 474/82 |
| 5,961,409 A * | 10/1999 | Ando | B62M 9/1244 | 474/80 |
| 6,793,598 B1 * | 9/2004 | Savard | B62M 9/1248 | 474/80 |
| 7,467,567 B2 * | 12/2008 | Fukuda | B62M 9/122 | 474/80 |
| 7,722,488 B2 * | 5/2010 | Kunisawa | B62M 9/126 | 474/80 |
| 7,824,285 B2 * | 11/2010 | Tan | B62M 9/127 | 474/80 |
| 7,871,346 B2 * | 1/2011 | Takachi | B62M 9/126 | 474/78 |
| 7,942,767 B2 * | 5/2011 | Yamaguchi | B62M 9/125 | 474/102 |
| 7,963,870 B2 * | 6/2011 | Deguchi | B62M 9/125 | 474/80 |
| 7,980,974 B2 * | 7/2011 | Fukuda | B62M 9/122 | 474/70 |
| 8,007,383 B2 * | 8/2011 | Watarai | B62M 9/125 | 474/116 |
| 8,012,052 B2 * | 9/2011 | Shahana | B62M 9/126 | 474/82 |
| 8,057,332 B2 * | 11/2011 | Takachi | B62M 9/127 | 474/80 |
| 8,202,182 B2 * | 6/2012 | Ishikawa | B62M 9/1248 | 192/226 |
| 8,277,346 B2 * | 10/2012 | Watarai | B62M 9/126 | 474/82 |
| 8,419,573 B2 * | 4/2013 | Yamaguchi | B62M 9/1242 | 267/155 |
| 8,602,929 B2 | 12/2013 | Ishikawa et al. | | |
| 8,678,962 B2 * | 3/2014 | Jordan | B62M 9/131 | 29/428 |
| 9,005,059 B2 * | 4/2015 | Suyama | B62M 9/122 | 474/80 |
| 9,005,060 B2 * | 4/2015 | Scolari | B62K 3/002 | 474/135 |
| 9,150,281 B2 * | 10/2015 | Yamaguchi | B62M 9/124 | |
| 9,511,820 B2 * | 12/2016 | Watarai | B62M 9/126 | |
| 10,011,325 B2 * | 7/2018 | Zawistowski | B62M 9/122 | |
| 2004/0106482 A1 | 6/2004 | Nagano | | |
| 2006/0100045 A1 * | 5/2006 | Fukuda | B62M 25/08 | 474/70 |
| 2014/0128191 A1 * | 5/2014 | Bohm | F16H 9/24 | 474/82 |
| 2015/0080160 A1 * | 3/2015 | Staples | B62M 9/10 | 474/160 |
| 2015/0111675 A1 * | 4/2015 | Shipman | B62M 9/122 | 474/82 |

FOREIGN PATENT DOCUMENTS

| | | | |
|---|---|---|---|
| EP | 1357023 A1 | 10/2003 | |
| EP | 1520777 B1 | 11/2006 | |
| EP | 1826115 A2 | 8/2007 | |
| EP | 2641823 A2 | 9/2013 | |

OTHER PUBLICATIONS

Italian Search Report and Written Opinion in Italian Application No. 102017000035716, dated Nov. 22, 2017, with English translation.

* cited by examiner ized quadrilateral linkages wherein the articulation axes are inclined with respect to the drop-out axis at an angle lower than the angle of inclination of the cassette.

BICYCLE REAR DERAILLEUR

CROSS REFERENCE TO RELATED APPLICATION

This application claims the benefit of Italian Application No. 102017000035716, filed on Mar. 31, 2017, which is incorporated herein by reference as if fully set forth.

FIELD OF INVENTION

The present invention relates to a bicycle rear derailleur.

BACKGROUND

The rear derailleur is a mechanical or electromechanical device that causes the displacement of the transmission chain among different toothed wheels of the cassette, for this purpose displacing a chain guide in which the chain is engaged.

Normally, the rear derailleur comprises an articulated quadrilateral linkage (typically an articulated parallelogram) with a base body and a movable body opposite the base body in the articulated quadrilateral, connected together through a pair of connecting rods hinged to such bodies according to four axes through four pin elements, wherein the base body is fixed to the bicycle frame and the movable body is connected to the chain guide.

The deformation of the articulated quadrilateral determines a displacement of the chain guide with respect to the frame in the axial direction with respect to the cassette.

The chain guide comprises an upper pulley and a lower pulley with rotation axes substantially perpendicular to the extension of the chain that engage the transmission chain accompanying it during a gearshifting operation.

The chain guide is further hinged to the movable body of the articulated quadrilateral so as to be able to rotate with respect to the latter in order to be able to allow the different winding diameters of the transmission chain on the cassette and to keep the transmission chain under tension.

The deformation of the articulated quadrilateral can be obtained by manual actuation, through the movement of control levers and the transmission thereof to the articulated quadrilateral through a cable of the Bowden type, or with hydraulic or motorized actuation, thanks to an electric motor that, following a suitable command input by the cyclist and through a suitable mechanism, mutually displaces different parts of the articulated quadrilateral, deforming it.

Bicycle gearshifts with motorized actuation are described for example in EP1357023; in these, the linkage acts by moving opposite pins of the articulated quadrilateral apart or towards one another.

In order to obtain precise gearshifting in rear derailleurs, it is suitable for the upper pulley of the chain guide to follow the profile of the sprockets of the cassette, namely a substantially constant distance from the sprockets during the entire excursion of the derailleur.

In this way, the transmission chain is accompanied with more fluidity and speed on the sprocket, facilitating gearshifting.

It is also preferable for the upper pulley to be arranged a very short distance from the sprockets, indeed a short distance between the chain guide and the toothed wheels determines a greater command sensitivity since, in such conditions, the displacement component of the chain guide parallel to the axis of the cassette corresponds to an inclination exerted on the chain sufficient to trigger a displacement from one sprocket to another.

In order to be able to follow the profile of the sprockets of the cassette, the upper pulley of the chain guide must thus be able to displace in an inclined direction with respect to its rotation axis and with respect to the rotation axis of the cassette.

For such a purpose, a known type of rear derailleur provides that the articulation axes of the articulated parallelogram are perpendicular to the connection axis between the rear derailleur and the bicycle frame (said drop-out axis) that is parallel to the rotation axis of the cassette (in turn coinciding with the rotation axis of the rear wheel).

In these rear derailleurs, the chain guide is hinged to the movable body of the articulated quadrilateral along an axis that does not coincide with the rotation axis of the upper pulley. The distance that separates these two axes is known as distance of eccentricity of the upper pulley.

In this type of rear derailleur, the movement of the upper pulley is given by a horizontal displacement, namely parallel to the drop-out axis, of the movable body of the articulated quadrilateral and by a vertical displacement, namely perpendicular to the drop-out axis, of the upper pulley.

In particular, the vertical displacement of the upper pulley is determined by a rotation around the hinge axis between the chain guide and the movable body of the articulated quadrilateral caused by the rotation of the chain guide to allow the different winding diameter of the transmission chain on a different sprocket.

The eccentricity of the upper pulley defines the value of the vertical displacement of the upper pulley; the greater the eccentricity, the greater the vertical displacement.

A second type of rear derailleur provides that the articulation axes of the articulated quadrilateral are inclined with respect to the drop-out axis by an angle approximately equal to the angle, called angle of inclination of the cassette, subtended by a line that joins the radial end of the smallest sprocket with the radial end of the largest sprocket of the cassette.

The upper pulley is mounted without eccentricity, namely its rotation axis coincides with the hinge axis between the chain guide and the movable body of the articulated quadrilateral.

In this way, the deformation of the articulated quadrilateral occurs along a direction parallel to the angle of inclination of the cassette, also displacing the upper pulley in the same direction. The rotation of the chain guide to allow the different winding diameter of the transmission chain on the different sprocket does not cause any displacement of the upper pulley.

The first type of rear derailleur briefly described above is used only when there is no front derailleur, namely it is usable in combination with one crankset only.

Indeed, a possible change of winding diameter of the transmission chain at the crankset would cause a rotation of the chain guide and a consequent displacement in the vertical direction of the upper pulley.

The second type of rear derailleur is scarcely usable in combination with cassettes wherein there is a remarkable difference in the number of teeth between the smallest sprocket and the largest one.

Indeed, in order to ensure a sufficient excursion of the derailleur, the connecting rods of the rear derailleur should be particularly long with a consequent increase in the space occupied and the weight of the derailleur.

In order to try to avoid the above, rear derailleurs have been developed with a mixed linkage, namely with articulation axes of the articulated quadrilateral inclined with respect to the drop-out axis and with a pulley having an eccentricity of less than 15 mm.

Such eccentricity of the upper pulley allows the size of the connecting rods of the articulated quadrilateral to be kept small and, at the same time, does not cause great drawbacks when a front derailleur is used.

Rear derailleurs having mixed linkage are therefore used in combination with a front derailleur when it is wished to adopt a cassette with a big difference in the number of teeth between the smallest sprocket and the largest sprocket.

SUMMARY

The Applicant has noted that in bicycles, especially in racing bicycles, it is always important to try to reduce the weight and, at the same time, to try to offer the cyclist a wide range of gear ratios.

The Applicant has perceived that by providing a cassette with large excursion, namely in which there is a remarkable difference in teeth between the smallest sprocket and the largest one and thus a big difference in diameter between two adjacent sprockets, it is possible to offer the cyclist a substantial excursion of possible gear ratios.

The present solution provides a rear derailleur comprising an articulated quadrilateral linkage having a base body, a movable body and a pair of connecting rods articulated to the base body and to the movable body along respective articulation axes that are parallel to one another and perpendicular to a reference plane. The base body is connectable to a bicycle frame along a drop-out axis. A chain guide is rotatably connected to the movable body around a first rotation axis and an upper pulley is rotatably connected to the chain guide around a second rotation axis. The first rotation axis is parallel to the second rotation axis and is spaced therefrom by a distance of eccentricity, preferably between 18 mm and 50 mm, including extreme values. An angle of inclination, preferable between 5° and 40°, including extreme values, of the articulated quadrilateral being defined by the angle that the drop-out axis and the reference plane form on a plane passing through the drop-out axis and perpendicular to the reference plane.

BRIEF DESCRIPTION OF THE DRAWINGS

The features and advantages of the present invention will become clearer from the following detailed description of some preferred embodiments thereof, made with reference to the attached drawings wherein.

DETAILED DESCRIPTION OF THE PREFERRED EMBODIMENTS

Figure 1:
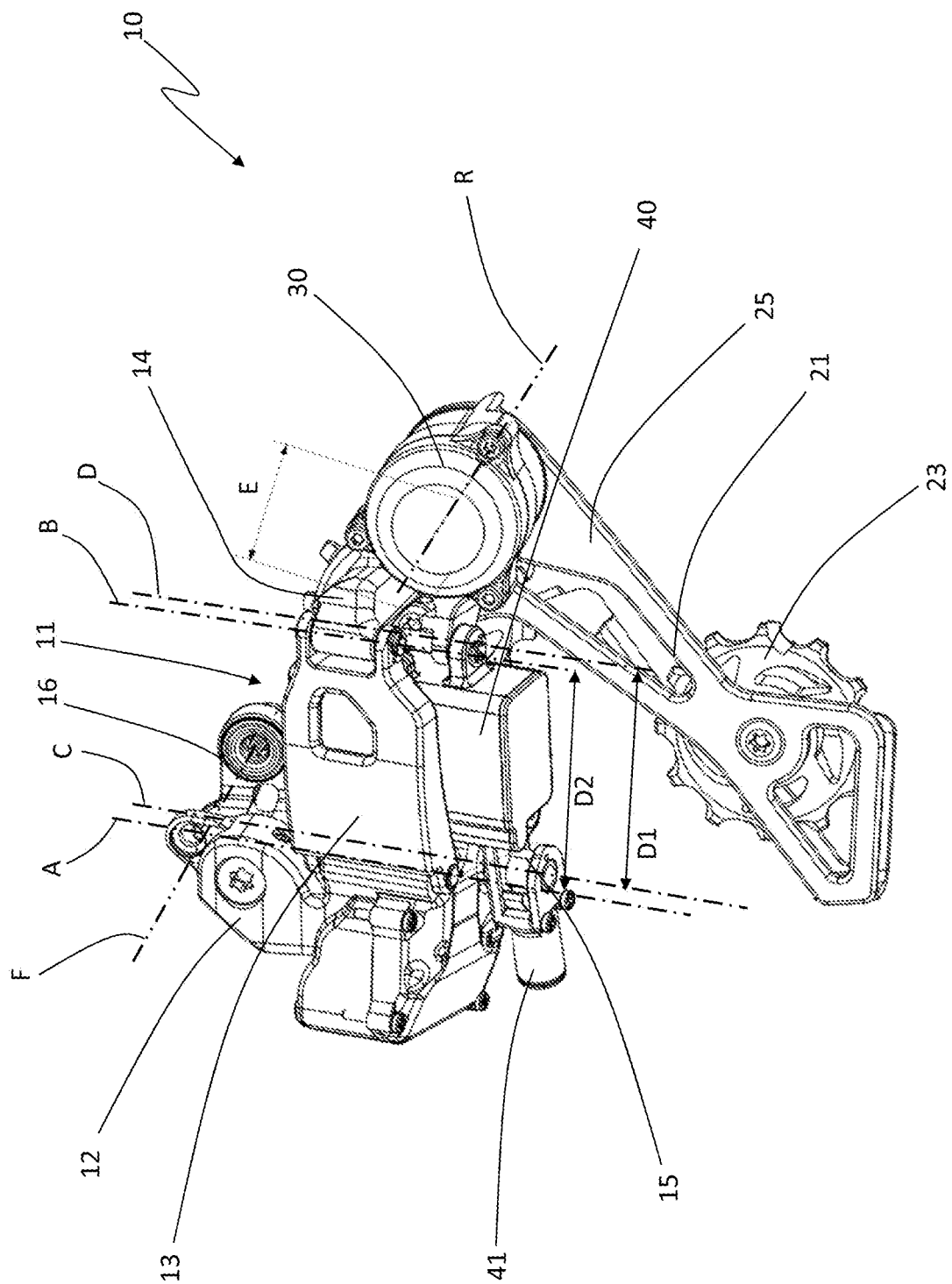
FIG. 1 is a perspective view of a rear derailleur according to the present invention.

The present invention relates to a rear derailleur comprising:

an articulated quadrilateral linkage having a base body, a movable body and a pair of connecting rods articulated to the base body and to the movable body along respective articulation axes that are parallel to one another and perpendicular to a reference plane;

said base body being connectable to a bicycle frame along a drop-out axis;

a chain guide being rotatably connected to said movable body around a first rotation axis;

an upper pulley being rotatably connected to said chain guide around a second rotation axis;

said first rotation axis being parallel to said second rotation axis and being spaced therefrom by a distance of eccentricity;

an angle of inclination of the articulated quadrilateral being defined by the angle that the drop-out axis and the reference plane form on a plane passing through the drop-out axis and perpendicular to the reference plane.

Preferably, the angle of inclination is substantially comprised between 5° and 40°, including extreme values, and the distance of eccentricity is comprised between 18 mm and 50 mm, including extreme values.

The Applicant has perceived that as a function of the difference between the number of teeth of the smallest sprocket and the number of teeth of the largest sprocket there is an optimal combination or a plurality of optimal combinations, between the distance of eccentricity of the upper pulley and the angle of inclination of the articulated quadrilateral, which ensure perfect operation of the rear derailleur.

The Applicant has noted that the possible combinations between the distance of eccentricity of the upper pulley and the angle of inclination of the articulated quadrilateral are almost infinite, since both such distances and such angles can vary with continuity between zero and a finite number.

The Applicant has found that by arranging the angle of inclination substantially comprised between 5° and 40°, including extreme values, and the distance of eccentricity comprised between 18 mm and 50 mm, including extreme values, the rear derailleur ensures perfect operation with a substantial number of mutually different cassettes.

In this manner, it is possible to use a cassette having great excursion, namely in which there is a substantial difference in teeth between the smallest sprocket and the largest one and therefore a great difference in diameter between two adjacent sprockets, ensuring that rear gearshifting is not impeded by impacts of the upper pulley against a sprocket and avoiding too long connecting rods.

The Applicant has found that a rear derailleur wherein the angle of inclination is substantially comprised between 5° and 40°, including extreme values, and the distance of eccentricity is comprised between 18 mm and 50 m, including extreme values, allows, for example, cassettes of the 11-29 type (the first number indicating the number of teeth of the smallest sprocket and the second number indicating the number of teeth of the largest sprocket), 10-42 type, 10-50 type and even 9-55 type to be used in a smooth and efficient manner, preferably when there is no front derailleur.

The Applicant has also noted that by arranging a rear derailleur wherein the angle of inclination substantially comprised between 5° and 40°, including extreme values, and the distance of eccentricity comprised between 18 mm and 40 mm, including extreme values, it is also possible to use a front derailleur in combination with the rear derailleur in any case ensuring a reasonable functionality of the rear derailleur.

The drop-out axis is the main reference axis for the elements that form part of the derailleur of the present invention; all of the indications of direction and similar, such as "axial", "radial", "circumferential", "diametral" will refer to it; equally, the indications "outwards" and "inwards" referring to radial directions must be interpreted to mean away from the axis or towards the axis. The axial direction is thus parallel to the direction of extension of the cassette of a bicycle, which coincides with the rotation axis of the hub of the rear wheel.

The rear derailleur of the present invention can comprise one or more of the following preferred features, taken singularly or in combination.

Preferably, said angle of inclination is comprised between 5° and 30°.

The Applicant has found that beyond an angle of inclination of about 40°, more preferably beyond about 30°, the length of the connecting rods would be too great to keep the weight of the derailleur low.

The Applicant has further found that an angle of inclination of less than 5° would require a too pronounced eccentricity with the risk of the upper pulley interfering with a sprocket during gearshifting.

Preferably, the distance of eccentricity is comprised between 20 mm and 50 mm, more preferably it is comprised between 25 mm and 50 mm.

The Applicant has found that 18 mm is the minimum eccentricity of the upper pulley to ensure acceptable lengths of the connecting rods.

Preferably, said first rotation axis and said second rotation axis are substantially parallel to one another.

Preferably, as the angle of inclination increases the distance of eccentricity decreases.

Preferably, the ratio between the angle of inclination expressed in degrees and the distance of eccentricity expressed in millimeters is comprised between 0.1 and 2.2.

Preferably, as the angle of inclination increases the ratio between the angle of inclination and the distance of eccentricity increases.

Preferably, as the difference between the number of teeth of the largest sprocket and the number of teeth of the smallest sprocket increases the maximum allowable distance of eccentricity increases.

Preferably, the projection of the distance between two articulation axes of a first connecting rod of the pair of connecting rods on a plane passing through the articulation axes of the other connecting rod is shorter than the distance between the two articulation axes of said other connecting rod.

When the articulated quadrilateral deforms to pass from an axially outermost position, corresponding to an engagement on the smallest sprocket of the cassette at an axially inner position, the movable body translates and rotates with respect to the fixed body through the effect of the different length of the two connecting rods.

This means that the chain guide and with it the second rotation axis, namely the rotation axis of the upper pulley, rotates with respect to the fixed body.

Since the transmission chain engages the upper pulley so as to orient itself perpendicular to the second rotation axis, the transmission chain is oriented in different directions depending on the position of the chain guide.

By suitably arranging the lengths of the two connecting rods, even when not parallel to one another, it is possible to ensure that the upper pulley always orients the transmission chain towards the crankset.

Preferably, when the chain guide is arranged at an intermediate distance between the axially outermost position and the axially innermost position, the second rotation axis is parallel to the drop-out axis.

Preferably, when the chain guide is arranged at the axially outermost position, the second rotation axis assumes a maximum inclination, in a first angular direction, with respect to the drop-out axis.

Preferably, when the chain guide is arranged at the axially innermost position, the second rotation axis assumes a maximum inclination, in a second angular direction opposite to the first, with respect to the drop-out axis.

This is particularly advantageous when only a single crankset is used.

Preferably, said first rotation axis is arranged a greater distance from the drop-out axis with respect to said second rotation axis.

The upper pulley is arranged in more advanced position with respect to the first rotation axis, namely it is arranged closer to the crankset with respect to the first rotation axis.

The rear derailleur can be of the mechanical type or of the electromechanical type.

In particular, said articulated quadrilateral linkage is deformable between an axially outer position of the chain guide and an axially inner position of the chain guide by a control cable placed under traction by a command.

Preferably, said articulated quadrilateral linkage is deformable between an axially inner position of the chain guide and an axially outer position of the chain guide by a return spring.

Alternatively, said articulated quadrilateral linkage is deformable between an axially outer position of the chain guide and an axially inner position of the chain guide and vice-versa by an electric actuator.

The rear derailleur of the present invention is preferably usable in combination with a cassette having a difference between the number of teeth of the sprocket having the largest diameter and the sprocket having the smallest diameter greater than or equal to 20.

With reference now to the figures, a bicycle rear derailleur is shown, wholly indicated with 10.

Figure 4:
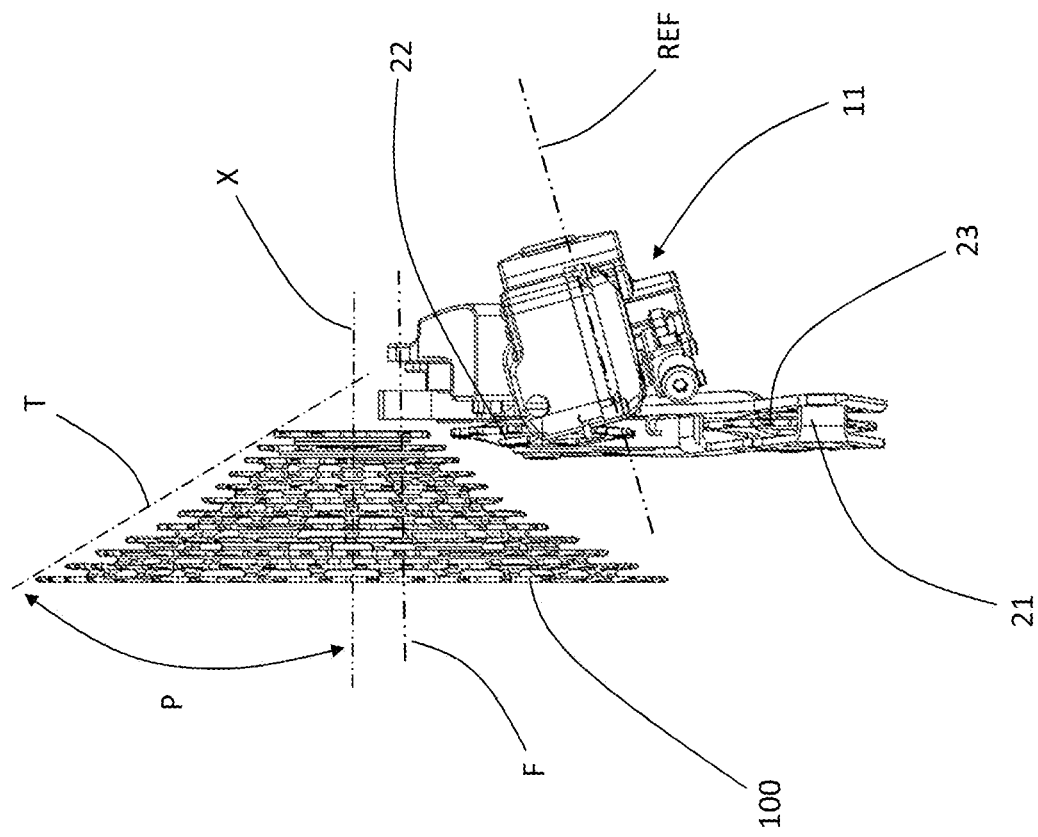
FIGS. 4 and 5 are rear views of the derailleur of FIG. 1 in two operative configurations.
Figure 5:
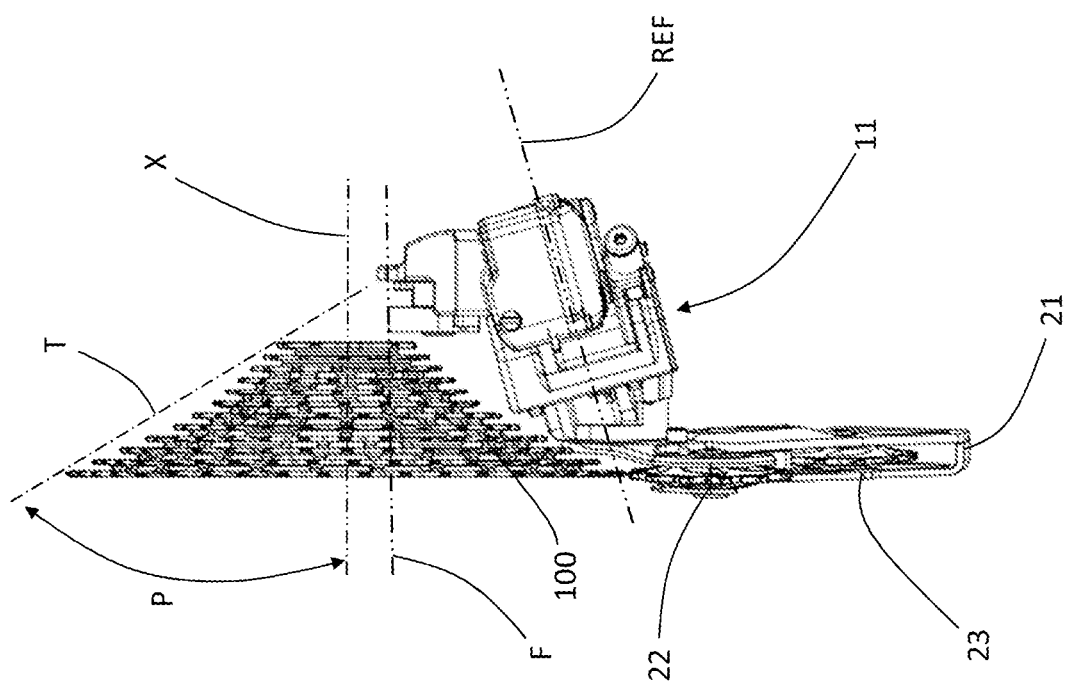

The rear derailleur 10 is adapted for displacing a transmission chain (not illustrated) between a plurality of sprockets 100 associated with a rear wheel of a bicycle. The sprockets 100 are different sizes from each other (as illustrated in FIGS. 4 and 5), are concentrically adjacent along an axial direction and rotate about an axis X coinciding with the rotation axis of the rear wheel.

The rear derailleur 10 comprises an articulated quadrilateral linkage 11 with a base body 12 and a movable body 14 connected together through a pair of connecting rods 13, 15 (FIG. 1).

The first connecting rod 13 is articulated to the base body 12 at a first articulation axis A and to the movable body 14 at a second articulation axis B, whereas the second connecting rod 15 is articulated to the base body 12 at a third articulation axis C and to the movable body 14 at a fourth articulation axis D.

The base body 12 is intended to be fixed to the bicycle frame, through an articulation element 16.

The articulation element 16 rotatably couples, in contrast to a pre-load spring (not illustrated), the articulated quadrilateral 11 with the bicycle frame.

The articulation element 16 is coupled with the bicycle frame along a drop-out axis F parallel to the rotation axis X of the cassette 100.

The movable body 14, opposite to the base body 12 in the articulated quadrilateral 11, is rotatably coupled with a chain guide 21 around a first rotation axis R.

The chain guide 21 can oscillate with respect to the movable body 14 rotating around the first rotation axis R to allow the different winding diameters of the transmission chain on the different sprockets of the cassette 100.

For this purpose, a connection pin 30 is provided for (FIG. 1) between the chain guide 21 and the movable body 14 on which a spring (not illustrated) for tensioning the transmission chain is active to apply a pair of forces to the chain guide 21 and ensure that the transmission chain is always under tension irrespective of the sprocket engaged thereby.

Such a spring preferably coincides with the pre-load spring that acts on the articulation element 16.

The connection pin 30 is equipped with a system for adjusting the pre-load of the chain tensioning spring.

The chain guide 21 comprises an upper pulley 22 and a lower pulley 23 about which the transmission chain is partially wound.

The lower pulley 23 is rotatably secured to two opposite plates 24, 25 of the chain guide 21.

The upper pulley 22 is rotatably secured to at least one 24 of the two plates 24, 25 of the chain guide 21, preferably to both of the plates 24, 25.

The two pulleys 22, 23 are rotatable about a respective second and third rotation axis RS, RI that, in some solutions, are parallel to one another.

The second and third rotation axis RS, RI always stay the same distance apart during the operation of the derailleur 10.

The second rotation axis RS does not coincide with the first rotation axis R.

Figure 3:
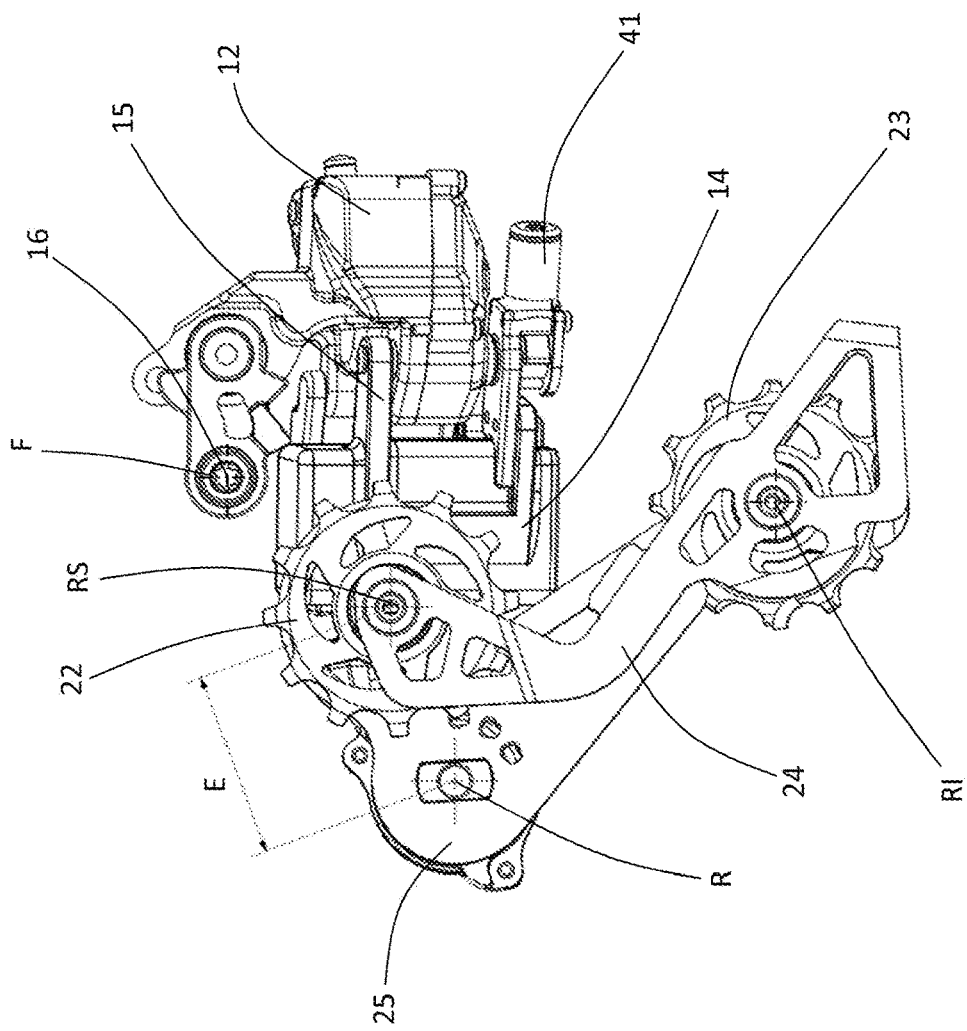
FIG. 3 is a side view of the derailleur of FIG. 2.

In particular, the second rotation axis RS of the upper pulley 22 is arranged a distance of eccentricity E from the first rotation axis R of the chain guide 11 with respect to the movable body 14, as illustrated in FIG. 3.

The distance of eccentricity E remains constant during the operation of the derailleur 10.

In order to displace the chain guide 21 and carry out gearshifting, the articulated quadrilateral 11 must be deformed.

For this purpose, actuation members 40 of the derailleur are provided for, which are adapted for changing the configuration of the articulated quadrilateral linkage 11 so as to determine a relative displacement between the movable body 14 and the base body 12 and, consequently, a displacement of the chain guide 21 with respect to the cassette 100.

The actuation members 40 can be of the completely mechanical type or of the electro-mechanical type, as in the example illustrated in the attached figures.

In the case of mechanical actuation members 40, a control cable of the Bowden type is actuated by a control arranged on the bicycle frame or, preferably, on the handlebars.

The control cable is active between the first connecting rod 13 and the base body 12 so that, when placed under tension, it drives the first connecting rod 13 in rotation with respect to the base body 12 deforming the articulated quadrilateral 11.

Such a deformation allows the movable body 14 to translate with a displacement component along an axial direction and thus allows the chain guide 21 to be displaced to different sprockets of the cassette 100.

Between the base body 12 and one of the two connecting rods 13, 15 a return spring is active that deforms the articulated quadrilateral 11 translating the chain guide 11 in the opposite direction when the control cable is loosened.

In the case of electromechanical actuation members, an electric actuator 41 is active between the base body 12 and one of the two connecting rods 13, 15, preferably the second connecting rod 15 as illustrated in FIG. 1.

Alternatively, the electric actuator 41 can be active on one of the articulation axes A, C between the base body 12 and the first connecting rod 13 or between the base body 12 and the second connecting rod 15.

The activation of the actuator 41 in a first operative mode, carried out by the cyclist by acting on a control arranged on the handlebars, rotates the connecting rod 13, 15 in a first angular direction with respect to the fixed body 12 and, consequently, deforms the articulated quadrilateral 11.

The deformation of the articulated quadrilateral 11 determines a displacement of the movable body 14 having a component along a first axial direction and thus displaces the chain guide 21 to different sprockets of the cassette 100.

The activation of the actuator 41 in a second operative mode, carried out by the cyclist by acting on the control arranged on the handlebars, rotates the connecting rod 13, 15 in a second angular direction, opposite to the first, with respect to the fixed body 12 and, consequently, deforms the articulated quadrilateral 11.

The deformation of the articulated quadrilateral 11 determines a displacement of the movable body 14 having a component along a second axial direction and thus displaces the chain guide 21 to different sprockets of the cassette 100.

Irrespective of the type of actuation members 40, the displacement of the chain guide 21 actuated by the deformation of the articulated quadrilateral 11 has the function of displacing the upper pulley 22 to the sprocket that must be engaged by the transmission chain.

In particular, the upper pulley 22 is translated so that it is positioned below the sprockets of the cassette 100 a distance from each sprocket that remains as constant as possible during the entire excursion of the derailleur.

As can be seen in FIGS. 4 and 5, the line T that passes through two radially outermost points of the smallest sprocket and of the largest sprocket of the cassette 100 is inclined with respect to the rotation axis X and thus with respect to the drop-out axis F by an angle P.

The translation of the movable body 14, and thus of the chain guide 21, actuated by the deformation of the articulated quadrilateral 11 is a translation that occurs along a direction inclined with respect to the drop-out axis F and thus with respect to the rotation axis X of the cassette 100.

Figure 2:
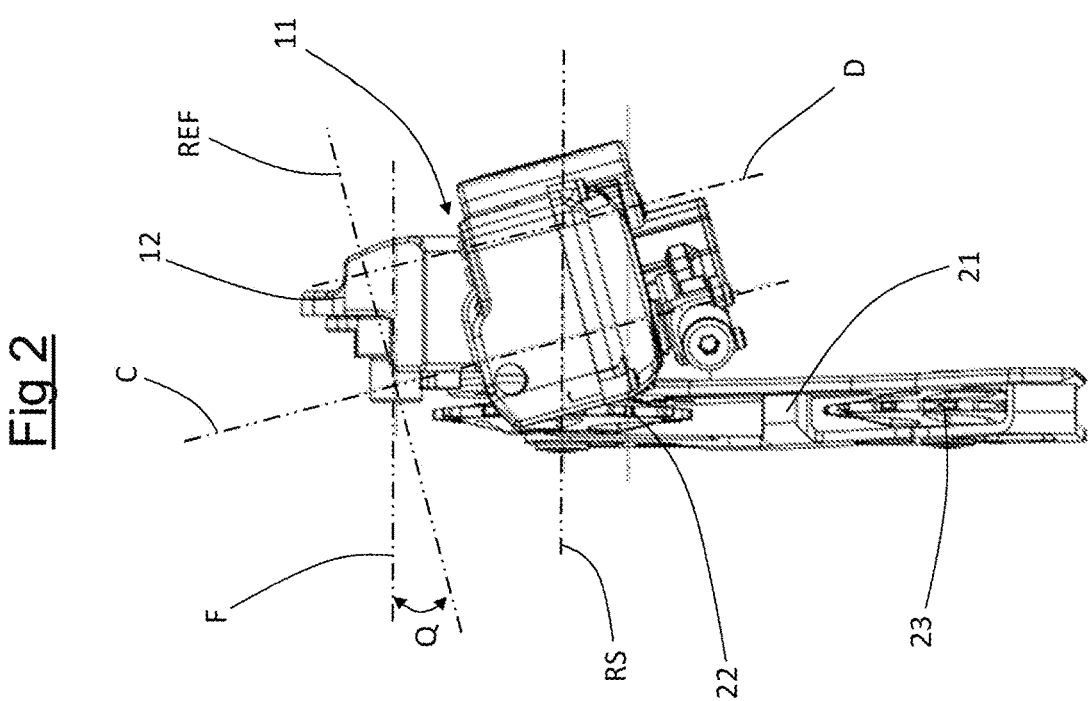
FIG. 2 shows the derailleur of FIG. 1 in a rear view.

Concerning this, the articulated quadrilateral 11 is inclined with respect to the drop-out axis F by an angle of inclination Q (represented in FIG. 2). The angle of inclination Q is defined by the angle that the drop-out axis F and a reference plane REF form on a plane passing through the drop-out axis F and perpendicular to the reference plane REF.

The reference plane REF (the line of which is visible in FIG. 2) is a plane perpendicular to the articulation axes A, B, C, D of the articulated quadrilateral 11.

The direction of translation of the movable body 14 following the deformation of the articulated quadrilateral 11 is inclined by the angle of inclination Q with respect to the drop-out axis F.

The upper pulley 22 is also translated together with the movable body 14, since the latter sets the chain guide 21 in motion during its translation.

Since during the translation of the movable body 14 the transmission chain is brought into engagement with a new sprocket of the cassette 100, the winding diameter of the transmission chain on the cassette 100 changes.

This determines a rotation of the chain guide 21 around the first rotation axis R and, consequently, a displacement of the second rotation axis RS of the upper pulley 22 with respect to the movable body 14. The size of such a displacement is directly proportional to the distance of eccentricity E. The displacement carried out by the second rotation axis RS with respect to the movable body 14 occurs along an arc of circumference the center of which coincides with the first rotation axis R of the chain guide 21 and the radius of which coincides with the distance of eccentricity E.

The upper pulley 22 is arranged on the opposite side towards the crankset of the bicycle with respect to the first rotation axis R of the chain guide 21. Therefore, as the winding diameter of the transmission chain on the cassette 100 increases, namely for gearshifting towards larger sprockets, the rotation of the chain guide 21 determines a displacement of the upper pulley 22 directed radially away from the drop-out axis F.

Conversely, as the winding diameter of the transmission chain on the cassette 100 decreases, namely for gearshifting towards smaller sprockets, the rotation of the chain guide 21 determines a displacement of the upper pulley 22 directed radially towards the drop-out axis F.

In this way, during a gearshifting operation the displacement of the upper pulley 22 adds to the displacement of the movable body 14 so that the upper pulley 22 can follow a trajectory substantially inclined by the same angle P of inclination as the cassette 100.

In order to ensure smooth and quick gearshifting, the ratio between the angle of inclination Q of the articulated quadrilateral expressed in sexagesimal degrees and the distance of eccentricity expressed in millimeters is comprised between 0.1 and 2.2, preferably comprised between 0.10 and 1.75.

As the angle of inclination Q of the articulated quadrilateral increases, the distance of eccentricity E decreases.

The maximum angle of inclination Q of the articulated quadrilateral is selected between a minimum of 5° up to a maximum value of 40°. In the preferred embodiments of the invention, the angle of inclination Q is comprised between 5° and 30°.

The maximum angle of inclination Q of the articulated quadrilateral 11 is selected so that the ratio between the angle of inclination Q of the articulated quadrilateral 11 and the angle of inclination P of the cassette used in combination with the derailleur 10 is always less than 0.6.

The distance of eccentricity is never less than 18 mm and is never greater than 50 mm.

In the preferred embodiments of the invention, the distance of eccentricity E is selected so as to be comprised between 20 mm and 50 mm, more preferably comprised between 25 mm and 50 mm.

For every angle of inclination P of the cassette 100 the ratio between the angle of inclination Q of the articulated quadrilateral expressed in sexagesimal degrees and the distance of eccentricity expressed in millimeters is always comprised between 0.1 and 2.2.

The following tables show some possible examples of combinations between the angle of inclination Q and the distance of eccentricity E for different cassettes 100, namely for cassettes having different angles of inclination P.

| Angle of inclination of cassette = 42.8° | | Angle of inclination of cassette = 58.7° | |
| --- | --- | --- | --- |
| Angle of inclination Q | Distance of eccentricity E | Angle of inclination Q | Distance of eccentricity E |
| 5 | 20.3 | 5 | 33.9 |
|  |  | 10 | 30.7 |
|  |  | 15 | 27.6 |
|  |  | 20 | 24.4 |
|  |  | 25 | 21.3 |
|  |  | 30 | 18.1 |

A cassette 100 having an angle of inclination P of 42.8° is for example a cassette wherein the number of teeth of the smallest sprocket is 11 and the number of teeth of the largest sprocket is 29.

The ratio between the angle of inclination Q and the eccentricity E can, preferably in combination with an 11-29 cassette, assume a value of about 0.25.

The preferred value of the angle of inclination Q is about 5° and the preferred value of the distance of eccentricity E is about 20 mm.

A cassette 100 having an angle of inclination P of 58.7° is for example a cassette wherein the number of teeth of the smallest sprocket is 10 and the number of teeth of the largest sprocket is 42.

The ratio between the angle of inclination Q and the eccentricity E can, preferably in combination with a 10-42 cassette, assume values comprised between about 0.15 and 1.66.

The preferred values of the angle of inclination Q are comprised between about 5° and about 30° and the preferred values of the distance of eccentricity E are comprised between about 18 mm and about 34 mm.

| Angle of inclination of cassette = 64.1° | | Angle of inclination of cassette = 67.1° | |
| --- | --- | --- | --- |
| Angle of inclination Q | Distance of eccentricity E | Angle of inclination Q | Distance of eccentricity E |
| 5 | 41.5 | 5 | 47.2 |
| 10 | 38.0 | 10 | 43.4 |
| 15 | 34.5 | 15 | 39.6 |
| 20 | 31.0 | 20 | 35.8 |
| 25 | 27.4 | 25 | 32.0 |
| 30 | 23.9 | 30 | 28.2 |
| 35 | 20.4 | 35 | 24.4 |
|  |  | 40 | 20.6 |

A cassette 100 having an angle of inclination P of 64.1° is for example a cassette wherein the number of teeth of the smallest sprocket is 10 and the number of teeth of the largest sprocket is 50.

The angle of inclination Q can, preferably in combination with a 10-50 cassette, assume values comprised between about 0.12 and about 1.72.

The preferred values of the angle of inclination Q are comprised between about 5° and about 35° and the preferred values of the distance of eccentricity E are comprised between about 20 mm and about 42 mm.

A cassette 100 having an angle of inclination P of 67.1° is for example a cassette wherein the number of teeth of the smallest sprocket is 9 and the number of teeth of the largest sprocket is 55.

The angle of inclination Q can, preferably in combination with a 9-55 cassette, assume values comprised between about 0.10 and about 1.94.

The preferred values of the angle of inclination Q are comprised between about 5° and about 40° and the preferred values of the distance of eccentricity E are comprised between about 20 mm and about 47 mm.

The first rotation axis R of the chain guide 21 and the second rotation axis RS of the upper pulley 22 are parallel to one another and perpendicular to a further reference plane (not indicated in the attached figures).

The further reference plane is parallel to the lying plane of the upper pulley 22.

The further reference plane and the drop-out axis F define an angle between them that is not constant for the entire excursion of the articulated quadrilateral 11.

In particular, the further reference plane and the drop-out axis F are perpendicular to one another when the upper pulley 22 is directed along a direction called chain line.

In this position of the chain guide 21, the lying plane of the upper pulley 22 is directed towards the crankset, so that the upper pulley 22 (and the lower pulley 23) orient the transmission chain towards the crankset.

When the chain guide 21 is arranged at the axially outermost position and thus the upper pulley 22 is arranged at the smallest sprocket of the cassette 100 (as illustrated in FIG. 5), the further reference plane and the drop-out axis F form a maximum angle in a first angular direction.

Also in this position of the chain guide 21, the lying plane of the upper pulley 22 is directed towards the crankset, so that the upper pulley 22 (and also the lower pulley 23) orient the transmission chain towards the crankset.

When the chain guide 21 is arranged at the axially innermost position and thus the upper pulley 22 is arranged at the largest sprocket of the cassette 100 (as illustrated in FIG. 4), the further reference plane and the drop-out axis F form a maximum angle in a second angular direction opposite to the first angular direction.

Also in this position of the chain guide 21, the lying plane of the upper pulley 22 is directed towards the crankset, so that the upper pulley 22 (and also the lower pulley 23) orient the transmission chain towards the crankset.

For this purpose, the projection of the distance D1 between the third articulation axis C and the fourth articulation axis D on a plane passing through the first A and the second articulation axis B is shorter than the distance D2 between the first A and the second articulation axis B.

In the case in which the first connecting rod 13 is parallel to the second connecting rod 15, the first connecting rod 13 is longer than the second connecting rod 15, so that the distance D2 between the first A and the second articulation axis B is greater than the distance D1 between the third articulation axis C and the fourth articulation axis D.

The deformation of the articulated quadrilateral 11 determines a roto-translation of the movable body 14 and, therefore, a roto-translation of the chain guide 21.

The rear derailleur can undergo numerous modifications and variants, all of which are encompassed by the scope of protection of the attached claims.

What is claimed is:

1. A bicycle rear derailleur comprising:
    an articulated quadrilateral linkage having a base body connectable to a bicycle frame along a drop-out axis (F), a movable body and a pair of connecting rods articulated to the base body and to the movable body along respective articulation axes that are parallel to one another and perpendicular to a reference plane (REF);
    a chain guide rotatably connected to said movable body around a first rotation axis (R);
    an upper pulley rotatably connected to said chain guide around a second rotation axis (RS);
    said first rotation axis (R) being spaced from said second rotation axis (RS) by a distance of eccentricity (E);
    an angle of inclination (Q) of the articulated quadrilateral defined by the angle that the drop-out axis (F) and the reference plane (REF) form on a plane passing through the drop-out axis (F) and perpendicular to the reference plane (REF);
    wherein the angle of inclination (Q) is between 5° and 40°, and the distance of eccentricity (E) is between 18 mm and 50 mm.

2. The rear derailleur according to claim 1, wherein said angle of inclination (Q) is between 5° and 30°.

3. The rear derailleur according to claim 2, wherein said distance of eccentricity (E) is between 20 mm and 50 mm.

4. The rear derailleur according to claim 1, wherein said first rotation axis (R) and said second rotation axis (RS) are substantially parallel to one another.

5. The rear derailleur according to claim 1, wherein as the angle of inclination (Q) increases the distance of eccentricity (E) decreases.

6. The rear derailleur according to claim 1, wherein a ratio between the angle of inclination (Q) expressed in sexagesimal degrees and the distance of eccentricity (E) expressed in millimeters is between 0.1 and 2.2.

7. The rear derailleur according to claim 1, wherein a projection of the distance between two articulation axes of a first connecting rod of the pair of connecting rods on a plane passing through the articulation axes of the other connecting rod is shorter than the distance between the two articulation axes of said other connecting rod.

8. The rear derailleur according to claim 1, wherein said first rotation axis (R) is arranged a greater distance from the drop-out axis (F) than said second rotation axis (RS).

9. The rear derailleur according to claim 1, wherein said articulated quadrilateral linkage is deformable between an axially outer position of the chain guide and an axially inner position of the chain guide by a control cable placed under traction by a command.

10. The rear derailleur according to claim 9, wherein said articulated quadrilateral linkage is deformable between an axially inner position of the chain guide and an axially outer position of the chain guide by a return spring.

11. The rear derailleur according to claim 1, wherein said articulated quadrilateral linkage is deformable between an axially outer position of the chain guide and an axially inner position of the chain guide and vice-versa by an electric actuator.

12. The combination of a rear derailleur according to claim 1 with a cassette having a difference between a number of teeth of a sprocket having a largest diameter and a sprocket having a smallest diameter greater than or equal to 20.

13. The rear derailleur according to claim 2, wherein said distance of eccentricity (E) is between 25 mm and 50 mm.

14. The rear derailleur according to claim 2, wherein said first rotation axis (R) and said second rotation axis (RS) are substantially parallel to one another.

15. The rear derailleur according to claim 14, wherein as the angle of inclination (Q) increases the distance of eccentricity (E) decreases.

16. The rear derailleur according to claim 15, wherein a ratio between the angle of inclination (Q) expressed in sexagesimal degrees and the distance of eccentricity (E) expressed in millimeters is between 0.1 and 2.2.

17. The rear derailleur according to claim 2, wherein a projection of the distance between two articulation axes of a first connecting rod of the pair of connecting rods on a plane passing through the articulation axes of the other connecting rod is shorter than the distance between the two articulation axes of said other connecting rod.

18. The rear derailleur according to claim 2, wherein said first rotation axis (R) is arranged a greater distance from the drop-out axis (F) than said second rotation axis (RS).

19. The rear derailleur according to claim 18, wherein said articulated quadrilateral linkage is deformable between an axially outer position of the chain guide and an axially inner position of the chain guide by a control cable placed under traction by a command.

20. The rear derailleur according to claim 19, wherein said articulated quadrilateral linkage is deformable between an axially inner position of the chain guide and an axially outer position of the chain guide by a return spring.

\* \* \* \* \*